United States Patent [19]
Liebl et al.

[11] Patent Number: 5,361,982
[45] Date of Patent: Nov. 8, 1994

[54] TEMPERATURE CONTROL SYSTEM HAVING CENTRAL CONTROL FOR THERMOSTATS

[75] Inventors: Ronald J. Liebl, Mukwonago; Paul W. Madaus, Oak Creek, both of Wis.

[73] Assignee: Johnson Service Company, Milwaukee, Wis.

[21] Appl. No.: 90,405

[22] Filed: Jul. 12, 1993

[51] Int. Cl.⁵ .............................................. F23N 5/20
[52] U.S. Cl. ................................... 236/46 R; 236/51; 236/47
[58] Field of Search .................... 236/51, 46 R, 47; 165/22, 12

[56] References Cited

U.S. PATENT DOCUMENTS

| | | | |
|---|---|---|---|
| 4,673,127 | 6/1987 | Grant | 236/51 |
| 4,682,648 | 7/1987 | Fried | 236/51 X |
| 4,819,714 | 4/1989 | Otsuka et al. | 236/51 X |
| 5,104,037 | 4/1992 | Karg et al. | 236/46 R |

Primary Examiner—William E. Wayner
Attorney, Agent, or Firm—Foley & Lardner

[57] ABSTRACT

Disclosed herein is a temperature control system for multi-zone temperature control with setback control. The system includes a thermostat associated with each zone of a building, and a central control unit which communicates with each thermostat to send temperature setpoint values to each thermostat for the purpose of conserving energy and reducing energy consumption during certain times of the day. Each thermostat is associated with either a heating or cooling device, where setup temperature values are sent from the central control unit to the thermostats where cooling devices are used in place of heating devices. The thermostats are designed to operate as stand-alone units which control the temperature within a zone based upon a temperature setpoint stored at the unit. The temperature setpoint values are replaced by the higher or lower temperature setpoint values transmitted to the thermostats by the control units during setback or setup time periods. To avoid the requirement of installing communication wires between the central control unit and thermostat, each thermostat and the central control unit includes communications circuitry which allows the thermostats and control unit to communicate over the power conductors within the building.

22 Claims, 2 Drawing Sheets

TEMPERATURE CONTROL SYSTEM HAVING CENTRAL CONTROL FOR THERMOSTATS

FIELD OF THE INVENTION

The present invention generally relates to thermostats for controlling electric heating and cooling devices. The devices are controlled to maintain the temperature at a particular location (zone) in a building within a selected temperature range. More specifically, the present invention relates to a temperature control system including a plurality of thermostats. The thermostats communicate with a controller over the electrical power conductors of a building, where the controller alternates temperature setpoints at the thermostats.

BACKGROUND OF THE INVENTION

Presently, a building with multi-zone electrical heat includes zones with one or more heating units (resistive electric baseboard or forced air heaters) which are each controlled by a single thermostat. The thermostats are typically of the type which have circuitry for switching the heating units ON and OFF based upon a comparison between a temperature setpoint value and the temperature monitored within the respective zone. In particular, the thermostats may use mechanical or electrical components and configurations to compare the setpoint and actual temperatures, and switch the heating units ON and OFF based upon the comparison.

Setback thermostats have become commonly used in buildings heated by a single heating unit (central furnace) for the purpose of conserving energy; however, the added cost of these thermostats prevents them from being cost effective for certain buildings having multi-zone electrical heat, and multiple thermostats. Additionally, even if setback thermostats where installed in every zone, it would be a burdensome task to maintain and revise all of the setback values for every thermostat. For example, for a building such as a home with ten rooms each controlled as separate zones by setback thermostats and each having 4 temperature settings for each day of the week, the user would be required to initially set and maintain 28 settings at 10 locations for a total of 280 settings.

Accordingly, it would be desirable to provide a central controller for storing and updating temperatures while also providing local temperature sensing and selectable temperature control. However, existing buildings are presently the largest market for installing such systems with central control, and, as is known, existing buildings, such as homes, generally are difficult to wire for communication links such as those required between a central controller and thermostats for each zone. Thus, it would also be desirable to provide a central controller and multiple thermostats which communicate using a medium which does not require the installation of wiring.

SUMMARY OF THE INVENTION

The present invention provides for a temperature control system for controlling the temperature in the heating or cooling zones of a building. The zones are each associated with at least one energy transferring unit such as a resistive heater or air conditioner. The system includes a plurality of thermostats each coupled to a respective energy transferring unit, where each thermostat controls the operation of the energy transferring unit to maintain the temperature of the respective zone within a predetermined range of a temperature setpoint for the zone. The setpoint is input by a user through an input device such as a keypad, and stored in a storage device such as a digital memory. The thermostat controls the energy transferring unit based upon a comparison of the temperature of the zone, as sensed at a temperature sensor, and the temperature setpoint. The thermostats also include a communications interface which permits the thermostats to communicate with other devices over the power lines of a building.

The system further includes a central control unit which includes a communications interface which permits the control unit to communicate with the thermostats of the system over the power lines. The central control unit stores alternate temperature setpoint values in reference to time values, where the values may be input and modified by a user through a user interface. A processor in the unit maintains a current time of day value and selectively applies the alternate temperature setpoint values, referenced to the time value equal to the current time of day value, to the control communications interface. The control communications interface transmits the setback signals representative of the alternate temperature setpoint values to the thermostats over the power lines. Upon receipt of the alternate temperature setpoint values, the thermostats compare the zone temperature with the alternate values rather than the zone setpoint values to control the respective energy transferring units.

In one embodiment of the system, the setpoint values and time values may be further stored in reference to address values each associated with a thermostat. Accordingly, different temperature setpoint values may be stored and applied to each thermostat depending upon the system requirements.

The present invention further provides a thermostat for communicating with the central control of a temperature control system for controlling the temperature in the heating zones of a building. The zones are each associated with at least one electric heater, where the thermostat controls the operation of the heater to maintain the temperature of the zone within a predetermined range of a temperature setpoint for the zone. The setpoint is input by a user through an input device such as a keypad, and stored in a storage device such as a digital memory. The thermostat controls the heater based upon a comparison of the temperature of the zone, as sensed at a temperature sensor, and the temperature setpoint. The thermostats also include a communications interface which permits the thermostats to communicate with other devices over the power lines of a building.

DETAILED DESCRIPTION OF THE PREFERRED EMBODIMENT

Figure 1:
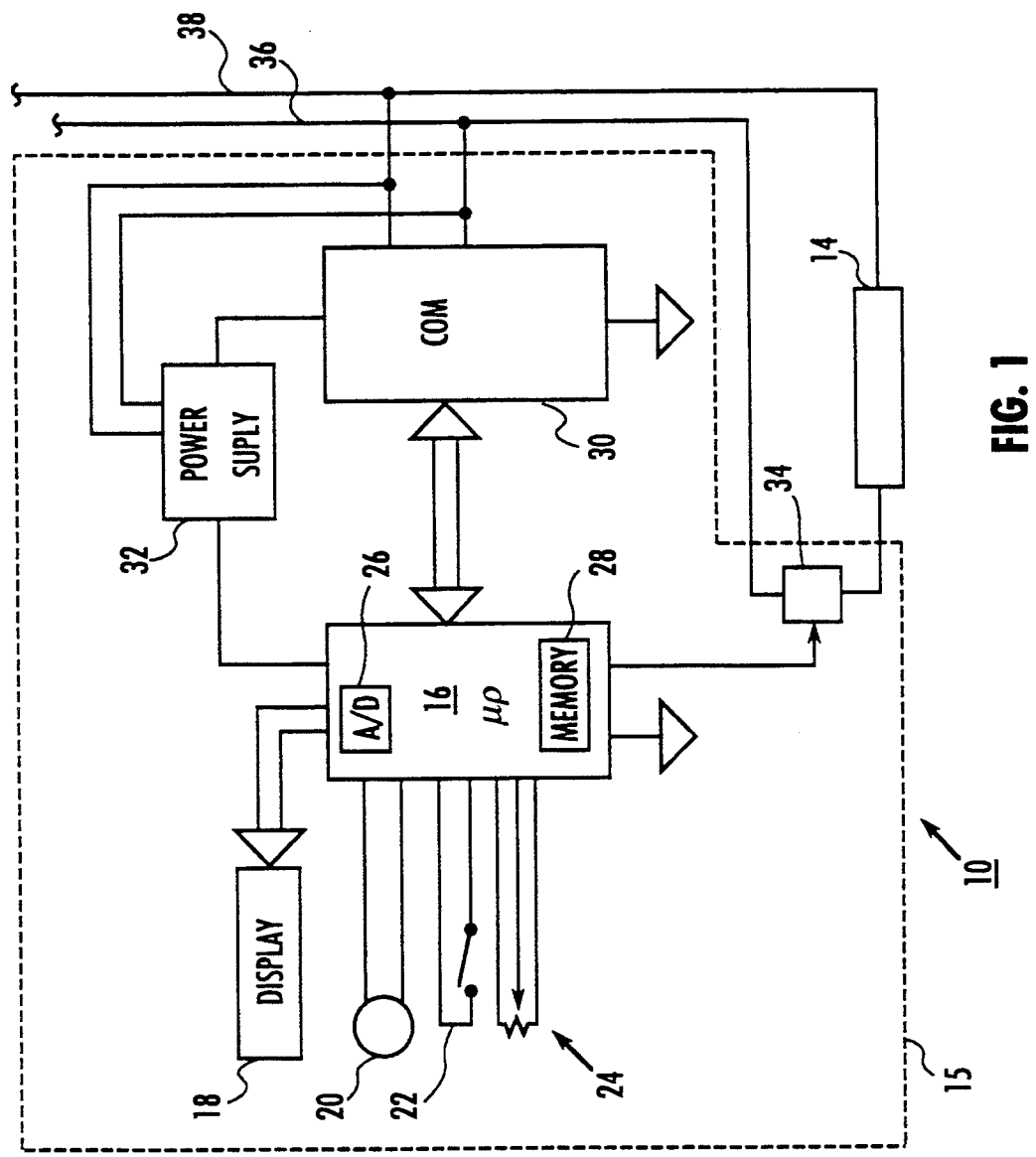
FIG. 1 is a block diagram of a thermostat control.
Figure 2:
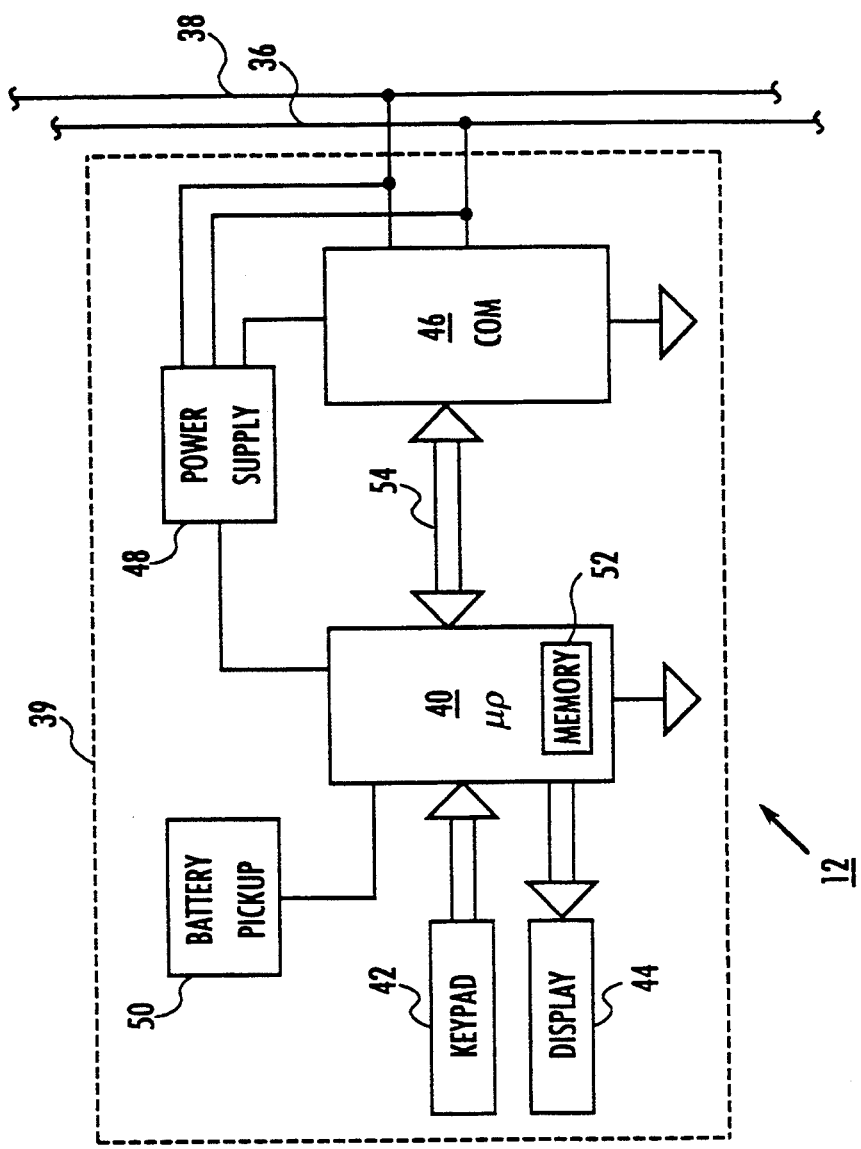
FIG. 2 is a block diagram of a central thermostat control unit.

Referring to the FIGURES, the preferred embodiment of the temperature control system includes a plurality of thermostat controls such as the control 10 illustrated in FIG. 1, and a central thermostat control unit such as the unit 12 illustrated in FIG. 2. Thermostat controls 10 are configured to control the operation of energy transferring units 14 such as a baseboard heating unit or an air conditioning unit. The energy transfer units 14 are each associated with a heating or cooling zone in a building and typically have two states which include an idle state and an energy transferring state. Accordingly, for a zone which is heated or cooled by a unit 14, a thermostat control 10 controls the operation of unit 14 to maintain the temperature within the zone at a level defined by the occupant. Where a number of zones are located within a particular building, and each zone includes a thermostat control 10 and associated unit 14 or group of units 14, the central thermostat control unit 12 provides temperature setback (for heating) or setup (for air cooling) capability for all of the thermostat controls 10.

Referring now to FIG. 1, thermostat control 10 includes a housing 15, a microprocessor 16, a display 18, a temperature sensor 20, a normally open override switch 22, and a temperature setpoint adjustment potentiometer 24. By way of example, microprocessor 16 may be of the type manufactured by Motorola having Model No. 68HC05P8. This type of microprocessor includes an internal analog-to-digital converter (A/D) 26 and internal memory 28. Memory 28 is of sufficient size to store programming and temperature setpoint values. Temperature sensor 20 is preferably an analog device which is coupled to A/D 26 and may be included within the housing of control 10, or positioned outside of the housing using appropriate conductors and circuit components to couple sensor 20 to A/D 26, depending upon the system requirements.

Override switch 22 is coupled to microprocessor 16 to permit microprocessor 16 to select one of a plurality of setpoint temperatures (e.g., two temperature values) stored in memory 28 for purposes of controlling unit 14. Potentiometer 24 is coupled to the analog-to-digital converter of microprocessor 16, wherein microprocessor 16 periodically monitors the value (offset value) produced by A/D 26 representative of the analog value at potentiometer 24. Microprocessor 16 utilizes the offset value to modify the selected setpoint value within a predefined range such as 5 degrees. This allows the temperature within the associated zone to be modified, within a limited range, by the occupant.

By way of modification, potentiometer 24 could be replaced with a digital device to permit the application of digital values representative of temperature setpoint directly to microprocessor 16.

Display 18 is one or more LEDs appropriately coupled to microprocessor 16 to indicate which of the setpoint values stored in memory 28 are being used by microprocessor 16 to control unit 14. For example, if memory 28 is configured to store a setback setpoint value and a normal setpoint value, display 18 would include one LED which would be illuminated when microprocessor 16 is controlling unit 14 based upon the setback setpoint value. Thus, when a user operates override switch 22 to toggle between setpoint values, the LED identifies the setpoint value being used by microprocessor 16 at that time.

Alternatively, display 18 could be an LCD display appropriately coupled to microprocessor 16 which produces an alphanumeric message representative of the setpoint value being used to control unit 14. With the use of the LCD display, microprocessor 16 may also be programmed to display zone temperature based upon the temperature sensed at sensor 20.

Thermostat control 10 also includes a communications circuit 30, a power supply circuit 32, and a power supply control switch 34. By way of example, communications circuit 30 may be of the type which permits communication over the power lines (120 VAC) 36 and 38 of a building using the Electronic Industry Association's (EIA) consumer electronic bus (CEBus) protocol. (By way of further example, the communications could utilize spread spectrum radio frequency.) More specifically, circuit 30 is preferably of the type which incorporates an Intellon Spread Spectrum Power Modem integrated circuit, and associated interfacing circuitry as is disclosed in revision 0.3 of the Intellon Advance Information literature dated Feb. 26, 1992 and directed to the CEBus Spread Spectrum Power Line Modem, the full disclosure of which is incorporated herein by reference. In operation, communications circuit 30 allows microprocessor 16 to communicate with other devices such as control unit 12 over power lines 36 and 38 of a building. Accordingly, the power lines simultaneously serve as electrical power (e.g. 240 VAC at 10–40 amperes) conductors and data channels. Circuit 30 is coupled to the ports of microprocessor 16 to provide bi-directional communication between microprocessor 16 and circuit 30. Circuit 30 is also coupled to the power conductors 36 and 38 of the associated building to provide bi-directional communication between control 10 and unit 12.

Power supply 32 is coupled to the power conductors of the building, and is coupled to microprocessor 16 and communications circuit 30 to provide low-voltage (e.g. 5 volts) power at the microprocessor 16 and circuit 30. Power supply control switch 34 may take a number of forms including a relay and transistor arrangement, or a triac. In operation, switch 34 is connected to power lines 36 and 38 in series with unit 14 to open and close the power supply circuit for unit 14. Switch 34 is coupled to microprocessor 16, and microprocessor 16 controls the status of switch 34, which in turn controls whether unit 14 is in an idle state or an energy transferring state (e.g. heating or cooling).

In operation, thermostat control 10 is powered from the power lines 36, 38 which provide power to unit 14. Control 10 monitors the temperature within the zone associated with unit 14, as sensed at temperature sensor 20, to control the state of unit 14 and in turn maintain the temperature within the zone at a temperature which is approximately the same as the selected (e.g., setback or normal) temperature setpoint stored in memory 28. (In general, the normal setpoint value would be considered the setpoint which results in the most desirable temperature for a zone, whereas a setback or setup setpoint value results in energy savings at the expense of having less desirable temperature in the zone.) As discussed above, sensor 20 produces a voltage signal, representative of the temperature within the zone, which is applied to A/D 26. Microprocessor 16 is programmed to periodically sample the value produced by A/D 26 which is representative of the signal at sensor 20, compare this value to the selected temperature setpoint value stored in memory 28, and control switch 34 based upon the difference between these values. In the presently preferred embodiment, microprocessor 16 is programmed to close switch 34 when the value from A/D 26 falls outside of a temperature band about the temperature setpoint value stored in memory 28. Additionally, microprocessor 16 may be programmed to perform anticipatory calculations which are designed to reduce overshoot and temperature cycling.

Referring to FIG. 2, central thermostat control unit 12 includes a housing 39, a microprocessor 40, a keypad 42, a display 44, a communications circuit 46, a power supply 48, and a battery backup circuit 50. Microprocessor 40 is also of the type having Model No. 68HC05P8 manufactured by Motorola Corporation, and includes internal memory 52. In the present embodiment, internal memory 52 is configured to store the programming and data required for the operation of control unit 12. By way of example, in the present embodiment of the system, memory 52 stores temperature setback, setup and normal setpoint values and associated time of day values. The time of day values may include both information as to the specific day of the week and the specific time of the day.

Keypad 42 is coupled to microprocessor 40 and includes a plurality of push buttons (e.g., 6 push buttons). Microprocessor 40 is programmed to interface with keypad 42 and allow a user to activate the keys of keypad 42 to modify the setback (setup for cooling) and normal setpoint temperatures and associated time of day values stored in memory 52. Display 44 is also coupled to microprocessor 40, where microprocessor 40 includes a program which allows microprocessor 40 to appropriately drive display 44 to display values representative of setback, setup and normal setpoint values, associated time of day values, and various other information such as user instructions or codes.

Communications circuit 46 is substantially the same as communications circuit 30, is coupled to microprocessor 40 via databus 54, and is coupled to power lines 36 and 38. Power supply 48 is coupled to power lines 36 and 38 and provides low-voltage power (e.g. 5 volts) for the operation of microprocessor 40 and communications circuit 46. Battery backup circuit 50 is coupled to microprocessor 40. Circuit 50 is provided to maintain power at microprocessor 40 so that the information in memory 52 is preserved even in the situation where the power on lines 36 and 38 is interrupted for a period of time sufficient to result in the loss of power from power supply 48.

In addition to the programming discussed above, microprocessor 40 may also be programmed to store address data which is associated with the setpoint temperature values (setback, setup and normal) and associated time of day values. In operation, the programming of microprocessor 40 operates to continuously produce a current time of day value and day of the week value based upon the cycling of the clock associated with microprocessor 40.

Turning now to the overall operation of the temperature control system, thermostat controls 10 and thermostat control unit 12 communicate in a bi-directional mode over the power lines 36 and 38 of the associated building. In one embodiment of the system, thermostat controls 10 are each assigned with a specific address which identifies the associated control 10. Microprocessor 40 is programmed to permit the user to store setpoint temperature values, and associated time of day and day of the week values in reference to a particular address (particular thermostat control 10). This allows the user to provide setback temperatures tailored for each zone within the building.

To simplify the programming of microprocessor 40 and reduce memory size requirements, it may be desirable to only provide one set of setpoint values to time of day and day of week values which are applied to all controls 10 without reference to address.

In operation, thermostat controls 10 operate as discussed above, independently of control units 12, to maintain the associated zone within a range of the temperature setpoint as stored in memory 28. In general, control units 12 control the application of setback, setup and normal setpoint values to each of thermostat controls 10. More specifically, microprocessor 40 is programmed to monitor the current time of day, compare the current time of day to the time of day values stored in memory 52 and transmit data signals to communications circuit 46 representative of the addresses and associated setback or setup setpoint temperature values which are transmitted upon power lines 36 and 38 to thermostat controls 10. In response, the communication circuits 30 of thermostat controls 10 transmit the setback, setup and normal setpoint temperature data, associated with the respective addresses, to microprocessor 16. Subsequently, microprocessor 16 stores setback, setup and normal setpoint temperature values, representative of the data transmitted across power lines 36 and 38, into memory 28. Microprocessor 16 controls the temperature within the associated zone based upon the setpoint temperature value as selected by button 22. Thus, for heating, button 22 would allow the user to select either the setback or normal setpoint temperature value and for cooling button 22 would allow the user to select either the setup or normal setpoint temperature value.

Depending upon the application, it may be desirable to transmit zone temperatures associated with a particular thermostat control 10 to control unit 12. In this situation, microprocessor 40 is programmed to transmit data request signals across power lines 36 and 38 to controls 10. In response, controls 10 respond to such signals by transmitting signals representative of the temperature sensed at the associated sensor 20 to control unit 12 across power lines 36 and 38.

With the above-described configuration and programming of microprocessors 16 and 20, setback or setup thermostat control can be provided at each thermostat control 10 for each zone within a building. Additionally, by providing override switch 22 and potentiometer 24 at each control 10, the occupant may select the normal zone temperature or modify the setback or setup temperatures within a limited range.

By way of modification, thermostat controls 10 may be modified to include occupancy sensors coupled to microprocessor 16. The purpose of the occupancy sensors is to produce a signal when a zone is occupied. Based upon this signal, microprocessors 16 override the setback or setup temperature values with the normal temperature setpoint value stored in memory 28, to control the temperature within the associated zone based upon the normal temperature setpoint value, rather than the setup or setback temperature value. This permits setback or setup control for all of the thermostat controls 10 within a system, while also ensuring comfort within those zones which are occupied.

By way of further modification, control unit 12 may be programmed to control thermostat units 10 to limit the total number of heating units 14 which are on at a given time. For example, if a building has 8 units 10 each associated with a unit 14, the system could operate so that only 4 units 14 were heating at a given time. This type of "load rolling" saves energy and can be coordinated with a utilities demand side managerial program.

It will be understood that the above description is of the preferred exemplary embodiment of the invention, and that the invention is not limited to the specific forms shown. For example, where the system is used with air conditioning devices, switches 34 would control the application of electrical power to the devices. Thus, the system can be configured for conserving energy when heating or cooling multiple zones. By way of further modification, central thermostat control unit 12 may be configured as a stand-alone unit which simply plugs into an outlet coupled to power lines 36 and 38, or may be configured as part of one of the thermostat controls 10 used in the system. By including the components of control unit 12 within the control 10, certain costs may be eliminated such as the cost of the additional power supply and communications circuit required for separate units. Various other substitutions, modifications, changes and omissions may be made in the design and arrangement of the elements of the preferred embodiment without departing from the spirit of the invention as expressed in the appended claims.

What is claimed

1. A temperature control system for multiple zone temperature control in a building, where each zone is associated with at least one energy transferring unit, the system comprising:
   a plurality of thermostats each coupled to a respective energy transferring unit, each thermostat including;
   a zone temperature setpoint storage device,
   a temperature sensor located in the respective zone and configured to produce a zone temperature signal representative of the temperature in the respective zone,
   a thermostat communications interface,
   a control signal output, and
   a thermostat processor operatively coupled to the storage device, and the sensor, where the processor is configured to compare the value of the zone temperature signal with a zone temperature setpoint value stored in the storage device and output a control signal representative of the comparison, the control signal being output at the control signal output;
   a plurality of control circuits each coupled between one of the control signal outputs and the respective energy transferring unit, and configured to control the state of the respective energy transferring unit based upon the respective control signal; and
   a central control unit including;
   a central storage device configured to store temperature setpoint values in reference to time values,
   a user interface operatively coupled to the storage device and configured to permit a user to modify the temperature setpoint and time values,
   a central control communications interface coupled to the thermostat communications interface,
   a control processor coupled to the central storage device and the central control communications interface, where,
   the processor is configured to produce a current time of day value and selectively apply the temperature setpoint values, referenced to the time value equal to the current time of day value, to the control communications interface, and
   the central control communications interface is configured to transmit setpoint signals representative of the temperature setpoint values to the thermostats;
   the thermostats storing zone temperature setpoint values representative of the setpoint signals in their respective zone temperature setpoint storage devices, where each thermostat processor subsequently compares the value of the temperature signals with the zone temperature setpoint values stored in the respective of the comparison, to the respective control outputs; and
   wherein the thermostat and central control communication interfaces are power line communication interfaces which are coupled via power conductors in the building.

2. The system of claim 1, wherein the storage device is configured to store normal temperature set point values and wherein the system includes an override circuit including an override switch and an adjustment device, said adjustment device providing an offset value, wherein the thermostat processor compares the value of the temperature signals with a normal temperature set point value stored in the storage device adjusted by the offset value in response to an override signal from the override switch, and wherein the processor applies control signals, representative of the comparison, to the respective control input.

3. The system of claim 2, wherein said adjustment device is a potentiometer coupled with said processor.

4. The system of claim 1, wherein the storage device is configured to store normal temperature setpoint values, and wherein the system further comprises at least one occupancy sensor coupled with at least one thermostat processor, the occupancy sensor providing an occupancy signal, wherein the thermostat processor compares the value of the temperature signals with a normal temperature setpoint stored in the storage device and applies control signals representative of the comparison to the respective control output in response to the occupancy signal.

5. The system of claim 1, where the energy transferring units are resistive heaters and each control unit couples at least one of the heaters to at least one of the power conductors.

6. The system of claim 1, wherein the energy transferring units are air conditioners and each control unit couples at least one of the air conditioners to at least one of the power conductors.

7. The system of claim 1, further comprising a low-voltage power supply coupled to the power lines, the control processor and the thermostat processor.

8. The system of claim 1, further comprising a first low-voltage power supply coupled to the power lines and the control processor, and a second low-voltage power supply coupled to the power lines and the thermostat processor.

9. A temperature control system for multiple zone temperature control comprising:
   a plurality of energy transferring units each configured to transfer energy relative to a respective zone and each having an idle state and an energy transferring state;
   a plurality of thermostats each coupled to a respective energy transferring unit, each thermostat including;
   data storage configured to store address data representative of the respective thermostat and zone temperature setpoint values,
   a temperature sensor configured to produce a zone temperature signal representative of the temperature in the respective zone,
   a thermostat communications interface,
   a control signal output, and
   a thermostat processor operatively coupled to the storage device, and the sensor, where the processor is configured to compare a value of the zone temperature signal with the zone temperature setpoint value stored in data storage and output a control signal representative of the comparison, the control signal being output at the control signal output;
a plurality of control circuits each coupled between one of the control signal outputs and the respective energy transferring unit, and configured to control the state of the respective energy transferring unit based upon the respective control signal; and
a central control unit including;
a central storage device configured to store temperature setpoint values in reference to time values and thermostat address data,
a user interface operatively coupled to the storage device and configured to permit a user to modify the temperature setpoint values, the time values and the address data,
a central control communications interface coupled to the thermostat communications interface,
a control processor coupled to the central storage device and the central control communications interface, where,
the processor is configured to produce a current time of day value and selectively apply the temperature setpoint values, referenced to the time value equal to the current time of day value, to the control communications interface, and
the central control communications interface is configured to selectively transmit setpoint signals representative of the temperature setpoint values to the thermostats based upon the thermostat address data;
the thermostats storing zone temperature setpoint values representative of the setpoint signals, referenced to the respective thermostat address data, in their respective data storage, where the thermostat processors subsequently compare the value of the temperature signals stored in the storage device and apply control signals, representative of the comparison, to the respective control outputs, and wherein the thermostat and central control communication interfaces are coupled via power conductors of the building.

10. The system of claim 9, wherein at least one of the thermostats comprises an override circuit coupled to the respective processor, the override circuit operable by user to apply an override signal and offset value to the respective processor, wherein, in response to the operation of the overrride circuit, the thermostat processor compares the value of the temperature signals with a normal temperature setpoint value adjusted by the offset value and applies control signals, representative of the comparison, to the respective control output.

11. The system of claim 10, wherein the override circuit includes a potentiometer to provide the offset value.

12. The system of claim 9, wherein the control processor is configured to limit a total number of energy transferring units which may be operated in the energy transferring state.

13. The system of claim 9, where the energy transferring units are resistive heaters and each control unit couples at least one of the heaters to at least one of the power conductors.

14. The system of claim 9, where the energy transferring units are air conditioners and each control unit couples at least one of the air conditioners to at least one of the power conductors.

15. The system of claim 9, further comprising a low-voltage power supply coupled to the power lines, the control processor and the thermostat processor.

16. The system of claim 9, further comprising a first low-voltage power supply coupled to the power lines and the control processor, and a second low-voltage power supply coupled to the power lines and the thermostat processor.

17. A thermostat for communicating with a temperature control system, the system including a central control for transmitting temperature signals, representative of temperature setpoint values, along electrical power conductors coupled to at least one resistive heating unit in a zone of a building, the thermostat comprising:
a data storage device;
a temperature sensor configured to produce a zone temperature signal representative of the temperature in the zone;
a thermostat communications interface including a data signal output, and a data signal input coupled to the power conductors;
a switching device coupled between the heating unit and at least one of the power conductors, the switching device including a control input; and
a processor operatively coupled to the storage device, the sensor, the control input and the data signal input, where the processor is configured to read data from the interface and store a zone temperature setpoint value representative of the data in the data storage device, sample the signal at the temperature sensor to produce temperature values representative of the zone temperature signal, and compare the temperature values with the zone temperature setpoint value and the temperature value, and apply first and second control signals to the control input depending upon the comparison, where the first control signal causes the switching device to permit current flow from the power conductors through the heating unit and the second control signal inhibits current flow from the power conductors through the heating unit.

18. The thermostat of claim 17, wherein the central control unit includes:
a central storage device configured to store temperature setpoint values in reference to time values,
a user interface operatively coupled to the storage device and configured to permit a user to modify the temperature setpoint values and the time values,
a central control communications interface configured for coupling to the power conductors and communication with the thermostat communications interface over the power conductors,
a control processor coupled to the central storage device and the central control communications interface, where,
the processor is configured to produce a current time of day value and selectively apply the setback temperature setpoint values, referenced to the time value substantially equal to the current time of day value, to the control communications interface, and
the central control communications interface is configured to transmit setpoint signals representative of the setback temperature setpoint values to the thermostat over the power conductors; and wherein the thermostat storing zone temperature setpoint values representative of the setpoint signals in the data storage devices, where the thermostat processor subsequently compares the value of the temperature signals with the zone temperature setpoint values stored in the storage device and applies control signals, representative of the comparison, to the respective control outputs.

19. The thermostat of claim 18, where the central storage device is configured to store temperature normal setpoint values, and the control processor is configured to transmit normal setpoint signals representative of the normal setpoint values to the thermostat with the transmission of the setpoint signals, where the thermostat stores normal zone temperature setpoint values representative of the normal setpoint signals in the data storage device, the thermostat including a user interface for providing an override signals, and the thermostat processor compares the value of the temperature signals with the normal setpoint values in response to the override signal.

20. The system of claim 19, wherein the user interface of the thermostat further comprises an override switch coupled to the processor and operable by a user to provide the override signal.

21. The thermostat of claim 18, further comprising a setpoint adjustment configured to permit the user to apply an offset value to the thermostat processor, where the thermostat compares the value of the temperature signals with a combination of the zone temperature setpoint values and the offset value.

22. The system of claim 21, wherein the user interface of the thermostat includes a potentiometer for setting the offset value.

* * * * *